United States Patent Office 3,267,129
Patented August 16, 1966

3,267,129
PREPARATION OF ACRYLONITRILE
Robert G. Roth, Dickinson, Tex., assignor to Monsanto Company, St. Louis, Mo., a corporation of Delaware
No Drawing. Filed Dec. 6, 1963, Ser. No. 328,526
1 Claim. (Cl. 260—465.3)

The present invention relates to an improvement in the production of acrylonitrile. More particularly, it relates to a method for suppressing the formation of tar which is formed during the production of acrylonitrile from acetylene and hydrogen cyanide in the presence of copper chloride catalysts.

It is well known that acrylonitrile can be produced by reacting acetylene with hydrogen cyanide in the presence of a cuprous salt catalyst. The catalyst most commonly employed is the so-called Nieuwland catalyst which comprises essentially an aqueous or nonaqueous solution of cuprous chloride and a solubilizing salt or salts acidified with an inorganic acid. In the continuous operation of the process, the activity of the catalyst gradually diminishes until it becomes necessary to renew the total catalyst supply in order to maintain an economic level of production of acrylonitrile. The system is a complex one and there are a number of factors which contribute to the loss of activity or poisoning of the catalyst. By-products are formed from side reactions of impurities in the acetylene used, such as diacetylene, allene, allylene, and the like, as well as from the interactions between unsaturated compounds such as vinylacetylene, divinylacetylene, and cyanobutadiene which arise in the reaction. Polymeric materials such as polyacrylic acids and polyamides also are thought to occur as impurities in the catalyst solution. Most of these by-products are carbon-containing compounds which appear as viscous tarry or resinous materials which are in part dispersed in the catalyst solution and in part float on top or settle to the bottom of the aqueous catalyst solution, depending upon catalyst density. This tar, in addition to reducing catalyst efficiency, interferes with smooth operation of the reactor by impeding the circulation of the liquid catalyst as well as hindering the evolution of the acrylonitrile vapors leaving the solution, thus lowering the space-time yield of acrylonitrile. It has been found, too, that the tar, although largely found in the top of the reactor, cannot be completely removed by simple draining because of its very viscous nature and the fact that it does not stratify or separate completely from the aqueous layer. Also, because of its viscous and sticky character, the tar deposits and adheres to various parts of the reactor and other processing vessels and pipes.

To overcome the difficulties created by tar formation, the usual procedure has been to discard the old catalyst solution when it becomes too viscous and its activity becomes too low and to replace it with fresh catalyst. The discarded catalyst is then subjected to regeneration for recovery of its copper values. While such techniques are suitable, the catalyst regeneration processes represent time-consuming and expensive operations. Thus, the advantages of a process for retarding, suppressing, and/or minimizing the formation of tar during the operation of the reaction system are immediately obvious.

It is an object of the invention to improve the process for the preparation of acrylonitrile by the catalytic reaction of acetylene and hydrogen cyanide.

It is a further object of the invention to reduce the amount of tar formed in the production of acrylonitrile by the reaction of acetylene and hydrogen cyanide in the presence of a Nieuwland catalyst and consequently to maintain the activity of the catalyst at a high level over longer periods of time than are presently achieved, resulting in higher yields of acrylonitrile per unit of catalyst employed.

These and other objects and advantages of the invention which will become apparent from the following description thereof are attained by reacting acetylene and hydrogen cyanide in the presence of a Nieuwland catalyst and adding to the reaction system a minor amount of a compound chosen from the group consisting of aliphatic and aromatic primary, secondary, tertiary, and quaternary amines and derivatives thereof; amine oxides and amine oxide hydrates; monohydric, dihydric, and trihydric phenols including substituted phenols such as alkyl-substituted phenols, aminophenols, nitrophenols, chloronitrophenols, and the like; monoalkyl and monoaryl ethers of hydroquinone; pyridine and alkyl-substituted pyridines; quinoline and derivatives thereof; alkali metal nitrites; quinone, anthraquinone, and acenaphthene quinone; phenanthroline; methylene blue; and mixtures thereof. The compounds especially preferred as additives for the control of tar formation are the p-nitroso diaryl amines.

As examples of suitable compounds which will reduce or retard tar formation according to the process of the invention, there may be enumerated the following:

Aliphatic amines such as methylamine, trimethylamine, dimethylamine, ethylamine, isopropylamine, methylethylamine, tert.-butylamine, propylamine, diethylamine, sec.-butylamine, methylpropylamine, methyldiethylamine, isobutylamine, ethylisopropylamine, butylamine, methylisobutylamine, tert.-amylamine, dimethylpropylamine, diisopropylamine, triethylamine, methylbutylamine, ethylpropylamine, isoamylamine, amylamine, dipropylamine, isohexylamine, hexylamine, methylamylamine, diisobutylamine, ethylpropylisobutylamine, heptylamine, tripropylamine, dibutylamine, sec.-octylamine, methylheptylamine, cyclohexylamine, and the like;

Aromatic amines such as aniline, methyl aniline, α - naphthylamine, phenyl - α - naphthylamine, phenyl-β-naphthylamine, cyclohexylnaphthylamine, ortho- and para-phenylene diamine, diphenyl-p-phenylene diamine, and hexamine;

Nitroso amines such as p-nitroso dimethyl aniline, p-nitroso diphenylamine, N-nitroso diphenylamine, N-nitroso di-β-naphthylamine, N-nitroso phenyl-β-naphthylamine, N-nitroso benzyl aniline, and the like;

N,N-dialkylhydroxylamines such as N,N-diethylhydroxylamine, N,N-di-n-butylhydroxylamine, N,N-dimethylhydroxylamine, N,N-dipropylhydroxylamine, N,N-diisopropylhydroxylamine, N,N - diamylhydroxylamine, N,N - n - propylmethylhydroxylamine, N,N - ethylmethylhydroxylamine, N,N-butylmethylhydroxylamine, and the like;

Alkanolamines or, as they are sometimes termed hydroxyamines, such as dimethyl ethanolamine, diethyl ethanolamine, dimethyl isopropanolamine, di-n-butyl ethanolamine, monoethanolamine, monoisopropanolamine, phenyl ethanolamine, N-phenyl-N-ethyl ethanolamine, N-benzyl-N-methyl ethanolamine, ethyl ethanolamine, diethanolamine, methyl diethanolamine, ethyl diethanolamine, butyl diethanolamine, phenyl diethanolamine, benzyl diethanolamine, isopropyl ethanolamine, dihexyl ethanolamine, benzyl ethanolamine, o-tolyl ethanolamine, di-(2-ethylhexyl)ethanolamine, 3-amino-1-propanol, 1-dimethylamino-2-propanol, 2-hexylamino-1-propanol, 2-dibutylamino - 1 - butanol, 4 - methylamino - 2 - butanol, 5-isopropylamino-1-pentanol, 1-diethylamino-2-pentanol, 1-dimethylamino-3-hexanol, di-(2-hydroxypropyl)amine, N-phenyl-N,N-di-(2-hydroxypropyl)amine, N-methyl-N,-N - di - (2 - hydroxybutyl)amine, N - benzyl - N,N - di-(2-hydroxypentyl)amine, N-ethyl-N,N-di-(3-hydroxyhexly)amine, N - benzyl - N - (4 - hydroxybutyl) - N - (6-hydroxyhexyl)amine, and the like;

Choline chloride; hydrazine, hydrazine hydrate, and alkyl hydrazines such as methyl hydrazine, dimethyl hydrazine, diethyl hydrazine, ethyl hydrazine, and the like;

Different types of amine oxides including trialkyl amine oxides such as trimethyl, triethyl, tributyl, trioctyl, etc., amine oxides, trialkylolamine oxides such as trimethanolamine oxide and triethanolamine oxide, mixed alkyl alkylol amine oxides such as diethyl ethanolamine oxide, triarylamine oxides such as triphenyl amine oxide, mixed alkyl arylamine oxides such as dimethyl aniline oxide, triaralkylamine oxides such as tribenzyl amine oxide, heterocyclic amine oxides such as pyridine oxide, quinoline oxide, and the like, as well as the hydrates of all these oxides; phenol, diamyl phenol, p-ethyl phenol, p-butyl phenol, 2,6-di-tertiary-butyl,4-methyl phenol, 2,4-dimethyl - 6 - butyl phenol, 2 - tertiary butyl - 4 - methoxy phenol, 2,6-dimethyl-4-ethoxy phenol, 4-butyl-2-ethyl naphthol, α-nitroso-β-naphthol, ortho-, meta-, and para-cresols, di-tertiary butyl m-cresol, ortho-, meta-, and para-xylenols, catechol, 3-methyl catechol, 3,5-diethyl catechol, secondary butyl catechol, 3-tertiary butyl catechol, 3-phenyl catechol, 3-benzyl catechol, 3-cyclohexyl catechol, resorcinol, dihydroxyxylol, mesoresorcinol, hydroquinone, pyrogallol, methyl pyrogallol, p-ethyl pyrogallol, tetrahydroxybenzene, pentahydroxybenzene, p-aminophenol, o-aminophenol, N-methyl-p-aminophenol, N-phenyl-p-aminophenol, N-benzyl-p-aminophenol, 4-cyclohexylaminophenol, o-nitrophenol, 2,4-dinitrophenol, 2,4,6-trinitrophenol, 2-nitro-4-chlorophenol, 2-nitro-4,6-dichlorophenol, 2-nitro-4-bromo-6-chlorophenol, and the like;

Hydroquinone monobenzyl ether, hydroquinone monoalkyl ethers such as hydroquinone monomethyl, monoethyl, monopropyl, monoisobutyl, monohexyl, mono-2-ethylhexyl ethers, and the like;

Pyridine, alkyl-substituted pyridines such as α-picoline, β - picoline, gamma - picoline, 2,3 - dimethyl pyridine, 2-ethyl pyridine, and the like;

Quinoline, 2-methyl quinoline, 3-ethyl quinoline, 2,4-dimethyl quinoline, isoquinoline, 8-hydroxyquinoline, 4-amino quinoline, and the like;

Sodium nitrite, potassium nitrite, lithium nitrite, and the like.

The quantity of the additive to be employed to control tar formation may vary within wide limits from as little as 0.001% to as much as 5% by weight of the catalyst solution. For economical reasons, it is preferred to utilize the least possible amount of the agent to secure the maximum desired effect. Hence, the preferred range for the additive includes those amounts from about 0.01% to about 2% by weight of the catalyst.

The additive for tar control may be charged as a batch to the catalyst before its use in the production of acrylonitrile or it may be added intermittently or continuously during the reaction of acetylene and hydrogen cyanide to produce acrylonitrile in amounts required to maintain the concentration at the desired level.

The process of the invention is illustrated in the following examples which, however, are not to be considered as limiting it in any manner whatsoever.

*Example 1*

A quantity of catalyst (about 800 ml.) containing 48% by weight cuprous chloride, 18.8% potassium chloride, 6.9% sodium chloride, 1.2% hydrochloric acid, and 25.1% water was charged to a suitable glass reactor. Acetylene and hydrogen cyanide were then passed at a space velocity of 50 liters of gas per liter of catalyst per hour into the reactor to produce acrylonitrile while the reaction temperature was maintained at about 80° C. Insoluble tar appeared in the catalyst solution after operation for a period of about 24 hours. Tar build-up after a period of about 48 to about 72 hours made operation of the reactor difficult, particularly with regard to control of hydrogen cyanide in the off gas. At the end of about 116 hours on stream, the catalyst solution had become oily and viscous and had a red-brown to black color as contrasted to the free-flowing fresh catalyst which was a clear liquid having a yellowish or straw coloration. Tar make or build-up was measured at the conclusion of the run and found to be 3.6 volume percent of the catalyst.

*Example 2*

A fresh batch of the catalyst solution used in Example 1 was made up and p-nitroso diphenylamine was added to the catalyst in an amount to provide 1,000 parts of this additive per million parts of catalyst solution. Thereafter, acetylene and hydrogen cyanide were passed into the catalyst to produce acrylonitrile under the same conditions employed in Example 1. No difficulties were experienced with operation of the reactor and after a period of operation lasting about 216 hours, examination of the catalyst solution showed that no insoluble tar had been formed. The catalyst solution appeared reasonably clear and had not changed significantly in color.

*Example 3*

A sample of a catalyst which had been employed in a commercial plant operation for the manufacture of acrylonitrile from acetylene and HCN was charged to the reactor used in the previous examples and 1,000 parts of p-nitroso diphenylamine per million parts of catalyst solution was added to it. Acetylene and hydrogen cyanide were then charged to the reactor to produce acrylonitrile employing the same reaction conditions as were used in Examples 1 and 2. At various intervals of time, the catalyst was regenerated by draining off approximately 30% of the amount in the reactor and replacing it with a catalyst which had been subjected to regeneration by a pyrolytic process. Prior to charging to the reactor, 1,000 p.p.m. of p-nitroso diphenylamine was added to the regenerated catalyst slurry. During the course of this run, a total of five regenerations was made. Samples of the spent catalyst which had been withdrawn were analyzed for insoluble tar. These analyses indicated that the original tar level of the catalyst solution was at about 3.0 volume percent, increased to 4.2% after 122 hours of operation, and then gradually diminished to 0.3% at 273 hours and subsequently to zero after 295 hours of operation. Samples of product acrylonitrile collected during the run were analyzed on the mass spectrometer and the hydrogen flame gas chromatograph. There were no indications that the quality of the nitrile product was in any way adversely affected by the addition of the p-nitroso diphenylamine during the reaction.

Some variations in reaction conditions for producing acrylonitrile from acetylene and HCN can be made without departing from the scope of the invention. Any aqueous acid-reacting solution of cuprous chloride prepared from suprous chloride and a solubilizing salt of the class consisting of ammonium, amine, and alkali metal salts can be employed. Potassium chloride, sodium chloride, ammonium chloride, and ethanolamine hydrochloride or mixtures of these are all suitable for incorporation with the cuprous chloride to increase the solubility of the latter. Since the copper chloride is effective as a catalyst only in the cuprous state, it is advisable to add a small amount of metallic copper to maintain the copper in the monovalent state and avoid the undesired side reactions brought about by cupric copper. While the acid reaction of the catalyst is preferably attained by adding hydrochloric acid, other strong acids such as hydrobromic acid, sulfuric acid, or phosphoric acid can be used. The strong acid content of the catalyst may be adjusted in the range from about 0.2% to about 1.5% by weight but preferably is maintained between about 0.5% and 0.8%. This acidity should be maintained throughout the life of the catalyst by recycling any vaporized acid to it or by adding fresh portions of acid.

Likewise, any anhydrous acidic solution of cuprous chloride can be employed as the catalyst. Nonaqueous solvents suitable for preparing such catalytic solutions include, for example, straight-chain amides of carboxylic acids such as acetamide, formamide, dimethylformamide, diethylacetamide, and the like; cyclic amides such as pyrrolidone, piperidone, caprolactam, and N-methyl and N-ethyl derivatives thereof; aliphatic and aromatic nitriles such as butyronitriles, benzonitrile, adiponitrile, and phenyl acetonitrile. Solubilizing salts such as the hydrochloride of an organic nitrogen base, specifically, for example, pyridine hydrochloride, may be employed with these solvents depending upon the solubility of the cuprous chloride in the particular solvent used. When an anhydrous catalyst solution is employed, dry hydrogen chloride is generally used to maintain its acidity.

The reaction may be carried out at temperatures between 0 and 200° C. but it is preferable to hold the temperature at around 80° C. when working under atmospheric pressure. The acetylene and the hydrogen cyanide may be passed in at atmospheric or at higher pressures. It is advantageous to work with an excess of acetylene, e.g., one part of hydrogen cyanide to ten parts of acetylene, to ensure complete utilization of the HCN but too great an excess leads to extensive formation of by-products derived solely from $C_2H_2$. A molar ratio of $C_2H_2$/HCN of about 5:1 to about 10:1 can be employed and preferably a ratio from about 5:1 to 7:1 is used. It is readily apparent that the process may be carried out either as a batch or a continuous operation.

What is claimed is:

In the synthesis of acrylonitrile by the reaction of acetylene and hydrogen cyanide in the presence of an acidic catalyst solution containing cuprous chloride, the method for suppressing the formation of tarry by-products which comprises adding to the reaction system an amount of p-nitrosodiphenylamine in the range from about 0.01% to about 2% by weight of the catalyst solution.

References Cited by the Examiner

UNITED STATES PATENTS

| | | | |
|---|---|---|---|
| 2,375,015 | 5/1945 | Marple et al. | 260—465.9 |
| 2,432,511 | 12/1947 | Davis et al. | 260—465.9 |
| 2,481,080 | 9/1949 | Castner et al. | 260—465.9 |
| 2,607,795 | 8/1952 | Stehman | 260—465.9 |
| 2,649,418 | 8/1953 | Stehman | 260—465.3 |
| 2,659,748 | 11/1953 | Franz | 260—465.3 |
| 2,678,944 | 5/1954 | Burland | 260—465.9 |
| 2,678,945 | 5/1954 | Taylor | 260—465.9 |
| 2,683,163 | 7/1954 | Nichols | 260—465.9 |
| 2,698,338 | 12/1954 | Heider | 260—465.9 |
| 2,719,169 | 9/1955 | De Croes et al. | 260—465.9 |
| 2,758,130 | 8/1956 | Couvillon | 260—465.9 |
| 2,783,269 | 2/1957 | Bellis | 260—465.9 |
| 2,920,098 | 1/1960 | Burrus et al. | 260—465.3 |
| 3,114,764 | 12/1963 | Rowbotton | 260—465.3 |
| 3,146,176 | 8/1964 | Roth | 260—465.9 X |
| 3,150,166 | 9/1964 | Pohlemann et al. | 260—465.9 X |

OTHER REFERENCES

Blout et al.: "Monomers," (chapter on "acrylonitrile") 1949, p. 14.

CHARLES B. PARKER, *Primary Examiner.*

JOSEPH P. BRUST, *Examiner.*